US012571909B2

(12) United States Patent
Rudnisky et al.

(10) Patent No.: US 12,571,909 B2
(45) Date of Patent: Mar. 10, 2026

(54) SYSTEMS AND METHODS FOR CONTROLLING THE OPERATION OF A VEHICULAR RADAR SYSTEM

(71) Applicant: Deere & Company, Moline, IL (US)

(72) Inventors: William John Rudnisky, Harbor City, CA (US); Mark Jeffrey Kuckelman, Long Beach, CA (US); Maritsa Negrete, Los Angeles, CA (US); Ali Mohamoud Gaildon, Cypress, CA (US)

(73) Assignee: Deere & Company, Moline, IL (US)

( * ) Notice: Subject to any disclaimer, the term of this patent is extended or adjusted under 35 U.S.C. 154(b) by 401 days.

(21) Appl. No.: 17/954,566

(22) Filed: Sep. 28, 2022

(65) Prior Publication Data

US 2024/0103159 A1 Mar. 28, 2024

(51) Int. Cl.
| | |
|---|---|
| *G01S 13/931* | (2020.01) |
| *G01S 7/295* | (2006.01) |
| *G01S 7/41* | (2006.01) |
| *G01S 13/72* | (2006.01) |

(52) U.S. Cl.
CPC ............ *G01S 13/931* (2013.01); *G01S 7/295* (2013.01); *G01S 7/41* (2013.01); *G01S 13/72* (2013.01); *G01S 2013/93271* (2020.01)

(58) Field of Classification Search
CPC ...... G01S 13/931; G01S 13/726; G01S 13/72; G01S 7/417; G01S 7/41; G01S 2013/0254; G01S 2013/417; G01S 2013/41; G05D 1/0257

USPC .......................................................... 342/70
See application file for complete search history.

(56) References Cited

U.S. PATENT DOCUMENTS

| | | | |
|---|---|---|---|
| 4,720,711 A | 1/1988 | Quesinberry et al. | |
| 4,996,532 A | 2/1991 | Kirimoto et al. | |
| 5,508,706 A * | 4/1996 | Tsou ....................... | G01S 7/032 |
| | | | 342/192 |
| 6,021,333 A | 2/2000 | Anderson et al. | |
| 6,750,810 B2 | 6/2004 | Shinoda et al. | |
| 6,853,329 B2 | 2/2005 | Shinoda et al. | |
| 6,891,496 B2 | 5/2005 | Husted et al. | |
| 7,196,656 B2 * | 3/2007 | Shirakawa ............ | G01S 13/424 |
| | | | 356/138 |

(Continued)

OTHER PUBLICATIONS

Non-Final Office Action for U.S. Appl. No. 18/100,526, dated Nov. 17, 2025, 7 pages.

*Primary Examiner* — Michael W Justice
(74) *Attorney, Agent, or Firm* — Gary L. Montle; Lucian Wayne Beavers; Patterson Intellectual Property Law, PC

(57) ABSTRACT

Systems and methods are provided for controlling a vehicular radar system. The radar scan patters used by the radar system when detecting objects in the environment around the vehicle can be controlled to gather additional information about the objects in the environment. The radar system can generate parameters about objects in the environment detected by the radar system. The parameters can then be evaluated to determine if the collection of additional information about the detected object in the environment is desirable. If additional information about the detected object in the environment is to be collected, a different radar scan pattern having different waveforms can be used to gather specific information about the object.

12 Claims, 8 Drawing Sheets

(56) References Cited

U.S. PATENT DOCUMENTS

| | | | |
|---|---|---|---|
| 7,250,853 B2* | 7/2007 | Flynn | G08B 13/1672 |
| | | | 340/541 |
| 7,664,533 B2 | 2/2010 | Logothetis et al. | |
| 7,724,180 B2* | 5/2010 | Yonak | H01Q 25/002 |
| | | | 343/753 |
| 8,922,419 B2 | 12/2014 | Rudnisky et al. | |
| 9,733,348 B2* | 8/2017 | Gazit | G01S 7/403 |
| 9,785,042 B2* | 10/2017 | Fujita | G01S 7/24 |
| 9,915,731 B2 | 3/2018 | Amano | |
| 10,004,020 B2 | 6/2018 | Yamamoto | |
| 10,054,661 B1 | 8/2018 | Rai et al. | |
| 10,291,755 B2 | 5/2019 | Knaappila | |
| 10,436,888 B2* | 10/2019 | Li | G01S 13/886 |
| 10,599,154 B2 | 3/2020 | Dean et al. | |
| 10,605,911 B1* | 3/2020 | Parker | G01S 13/42 |
| 10,627,507 B1 | 4/2020 | Parker et al. | |
| 10,795,014 B2* | 10/2020 | Shan | G01S 13/931 |
| 10,823,838 B2* | 11/2020 | Billaud | H01Q 3/24 |
| 10,848,718 B2 | 11/2020 | Ozbilgin et al. | |
| 10,859,693 B1 | 12/2020 | Sabripour et al. | |
| 10,906,452 B2 | 2/2021 | Boehm et al. | |
| 10,983,204 B2 | 4/2021 | Kim | |
| 11,209,534 B2* | 12/2021 | Leabman | A61B 5/021 |
| 11,327,167 B2* | 5/2022 | Vaishnav | G01S 7/415 |
| 11,360,188 B2* | 6/2022 | Leabman | A61B 5/05 |
| 11,360,210 B2* | 6/2022 | Amadjikpe | H04B 7/0434 |
| 11,366,197 B2* | 6/2022 | Leabman | G01S 7/0234 |
| 11,450,957 B2 | 9/2022 | Sakuma | |
| 11,458,890 B2 | 10/2022 | Kang | |
| 11,487,002 B2* | 11/2022 | Matsuda | G01S 13/93 |
| 11,606,492 B2 | 3/2023 | Camacho et al. | |
| 11,611,707 B2 | 3/2023 | Camacho et al. | |
| 11,685,310 B2 | 6/2023 | Kang | |
| 11,698,452 B2* | 7/2023 | Bialer | G01S 13/723 |
| | | | 342/71 |
| 11,719,803 B2 | 8/2023 | Zaidi | |
| 11,802,937 B2 | 10/2023 | Fang et al. | |
| 11,802,954 B2* | 10/2023 | Anno | G01S 13/584 |
| 11,802,958 B2 | 10/2023 | Levitan et al. | |
| 11,822,003 B2 | 11/2023 | Zhang et al. | |
| 11,844,122 B2* | 12/2023 | Kumari | H04W 72/046 |
| 11,867,789 B2* | 1/2024 | Sudarsan | G01S 13/931 |
| 11,921,233 B2* | 3/2024 | Frank | G01S 7/4017 |
| 12,000,951 B2 | 6/2024 | Arbabian et al. | |
| 12,162,512 B2 | 12/2024 | Li et al. | |
| 12,408,068 B2* | 9/2025 | Zhang | G01S 7/0236 |
| 2003/0112172 A1 | 6/2003 | Shinoda et al. | |
| 2003/0164791 A1 | 9/2003 | Shinoda et al. | |
| 2003/0206130 A1 | 11/2003 | Husted et al. | |
| 2004/0164892 A1 | 8/2004 | Shinoda et al. | |
| 2006/0066474 A1* | 3/2006 | Shirakawa | G01S 13/424 |
| | | | 342/155 |
| 2006/0139162 A1* | 6/2006 | Flynn | G08B 31/00 |
| | | | 340/521 |
| 2008/0129581 A1 | 6/2008 | Douglass et al. | |
| 2008/0266169 A1* | 10/2008 | Akita | G01S 13/931 |
| | | | 342/117 |
| 2008/0272955 A1* | 11/2008 | Yonak | H01Q 15/0086 |
| | | | 342/54 |
| 2013/0194127 A1 | 8/2013 | Ishihara et al. | |
| 2014/0159934 A1 | 6/2014 | Rudnisky et al. | |
| 2016/0025853 A1 | 1/2016 | Amano | |
| 2016/0047907 A1* | 2/2016 | Izadian | H01Q 3/2605 |
| | | | 342/368 |
| 2017/0255093 A1* | 9/2017 | Fujita | G01S 13/931 |
| 2017/0359764 A1 | 12/2017 | Yamamoto | |
| 2019/0020741 A1 | 1/2019 | Knaappila | |
| 2019/0033439 A1* | 1/2019 | Gu | G01S 7/415 |
| 2019/0049977 A1 | 2/2019 | Dean et al. | |
| 2019/0072659 A1* | 3/2019 | Gu | G01S 13/42 |
| 2019/0146078 A1* | 5/2019 | Billaud | G01S 13/782 |
| | | | 342/39 |
| 2019/0187276 A1* | 6/2019 | Matsuda | G01C 3/08 |
| 2019/0219685 A1* | 7/2019 | Shan | G01S 13/89 |
| 2019/0271765 A1 | 9/2019 | Ben Khadhra et al. | |
| 2019/0281260 A1 | 9/2019 | Ozbilgin et al. | |
| 2019/0285743 A1 | 9/2019 | Kaino | |
| 2019/0356060 A1 | 11/2019 | Daniel et al. | |
| 2019/0361105 A1 | 11/2019 | Kim | |
| 2020/0033470 A1 | 1/2020 | Brankovic et al. | |
| 2020/0036487 A1 | 1/2020 | Hammond et al. | |
| 2020/0086787 A1 | 3/2020 | Kang | |
| 2020/0103498 A1* | 4/2020 | Frank | G01S 7/411 |
| 2020/0148094 A1 | 5/2020 | Boehm et al. | |
| 2020/0191932 A1* | 6/2020 | Leabman | G01S 13/106 |
| 2020/0191944 A1* | 6/2020 | Leabman | G01S 13/88 |
| 2020/0191945 A1* | 6/2020 | Leabman | G01S 7/282 |
| 2020/0371229 A1 | 11/2020 | Levitan et al. | |
| 2020/0393552 A1 | 12/2020 | Fang et al. | |
| 2021/0080557 A1* | 3/2021 | Vaishnav | G01S 13/72 |
| 2021/0106234 A1* | 4/2021 | Leabman | G01S 13/26 |
| 2021/0124011 A1 | 4/2021 | Madhow et al. | |
| 2021/0247509 A1* | 8/2021 | Anno | G01S 13/584 |
| 2021/0255298 A1* | 8/2021 | Leabman | G01S 13/106 |
| 2021/0255299 A1* | 8/2021 | Leabman | G01S 7/03 |
| 2021/0302570 A1* | 9/2021 | Ichiki | G01S 7/41 |
| 2021/0344113 A1 | 11/2021 | Sakuma | |
| 2021/0362650 A1 | 11/2021 | Kang | |
| 2021/0364628 A1* | 11/2021 | Leabman | A61B 5/05 |
| 2022/0018954 A1* | 1/2022 | Santucci | B62J 6/20 |
| 2022/0066025 A1* | 3/2022 | Berkmo | G01S 13/867 |
| 2022/0095151 A1* | 3/2022 | Zhang | G01S 7/0236 |
| 2022/0187441 A1* | 6/2022 | Bialer | G01S 13/62 |
| 2022/0276336 A1 | 9/2022 | Zhang et al. | |
| 2022/0308204 A1 | 9/2022 | Zaidi | |
| 2022/0377232 A1 | 11/2022 | Camacho et al. | |
| 2022/0377242 A1 | 11/2022 | Camacho et al. | |
| 2023/0043235 A1* | 2/2023 | Kumari | H04B 7/0617 |
| 2023/0103178 A1 | 3/2023 | Li et al. | |
| 2023/0168351 A1 | 6/2023 | O'Donnell | |
| 2023/0239772 A1 | 7/2023 | Deng et al. | |
| 2023/0358882 A1* | 11/2023 | Berkmo | G08G 5/22 |
| 2023/0408675 A1* | 12/2023 | Chang | G01S 13/584 |
| 2024/0015495 A1 | 1/2024 | Feng et al. | |

* cited by examiner

SYSTEMS AND METHODS FOR CONTROLLING THE OPERATION OF A VEHICULAR RADAR SYSTEM

BACKGROUND

The present application generally relates to controlling radar systems. More specifically, the present application is directed to systems and methods for controlling the operation of a vehicular radar system.

Radar systems have been incorporated in many vehicles to aid in safe operation and navigation of the vehicle by sensing the surrounding environment of a vehicle. Generally, the vehicular radar systems include one or more transmitters that send out electromagnetic waves and one or more receivers that detect the returning waves after they encounter an object in the environment. The radar system can then process the signals associated with the returning waves to generate information (e.g., position and velocity relative to the vehicle) about the detected object. The generated information about the detected object can then be used to control the operation of the vehicle. For example, upon detecting an object within the trajectory of the vehicle, the radar system (or other vehicle control system) may alert the driver or pilot of the vehicle, perform evasive or remedial actions to avoid a collision (e.g., apply brakes or turn vehicle), or a combination of the previous actions or other types actions to maintain safe operation of the vehicle.

Typically, vehicular radar systems are "open-loop" systems that repeat the same scan pattern of electromagnetic waves for as long as the radar system is in operation. For example, a radar scan pattern used by the vehicular radar system may include one of more short range scans (using a first waveform) followed by one or more long range scans (using a second waveform). The iterative use of the single radar scan pattern by the vehicular radar system can be useful for the general purpose of locating objects near the vehicle. However, depending on the use of the generated information about the detected object, the iterative use of the single radar scan pattern by the vehicular radar system may not provide sufficient information to appropriately determine subsequent actions. For example, if a vehicular radar system using a single scan pattern is incorporated in an autonomous vehicle, the generated information about a detected object may not be sufficient for the autonomous vehicle to determine the best course of action in response to the detected object. Thus, what is needed is a way to adapt the radar scan pattern of a vehicular radar system to the surrounding environment.

SUMMARY

The present application is directed to systems and methods for controlling the operation of a vehicular radar system. The vehicular radar system can incorporate a "feedback loop" that permits the radar system to autonomously adapt to the environment surrounding the vehicle. The vehicular radar system can use artificial intelligence (AI) (including, but not limited to, machine learning, neural networks, deep learning and computer vision) to augment the ability of the radar system to make decisions about the best possible next waveform(s) or area to be scanned by the radar system. The vehicular radar system can generate radar scan patterns that can incorporate different waveforms by making inferences about the environment surrounding the vehicle.

The vehicular radar system can change the properties (e.g., frequency, pulse width, chirp frequency and/or number of pulses) of the waveforms emitted by the radar system to extract particular information and/or parameters associated with objects in the environment that have been detected by the radar system. In addition, the vehicular radar system can generate nuanced data products (e.g., inferences about detected objects) from the "raw" data received by the radar system. The nuanced data products can then be evaluated using the AI of the vehicular radar system to determine the properties of the waveforms to be emitted by the vehicular radar system. For example, when an object suddenly enters the trajectory of a vehicle, the vehicular radar system can focus on the object and optimize the radar scan (or collection) pattern to get additional relevant information about the object. The waveforms emitted by the vehicular radar system can be adapted to optimize the signal-to-noise ratio (SNR) or select parameters to be able to extract additional information about the object. For example, the waveforms can be adapted to extract additional information (e.g., higher resolution information or data) relating to the object's range or distance from the vehicle, velocity (or information related to the vehicle's closing speed with respect to the object) and/or angular position. The vehicular radar system can continue to collect information about the object, as described above, until a desired amount of information is collected (e.g., the collection of further information will not yield additional information of significance about the object) or the object moves away from the vehicle. After that, the vehicle radar system can return to "normal" operation in which the radar system uses predefined radar scan patterns to detect for objects and/or possible collision events.

One advantage of the present application is that the vehicular radar system can dynamically respond to changes in the environment around the vehicle.

Another advantage of the present application is that the emitted waveforms from the vehicular radar system can be adapted to collect detailed information about an object.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
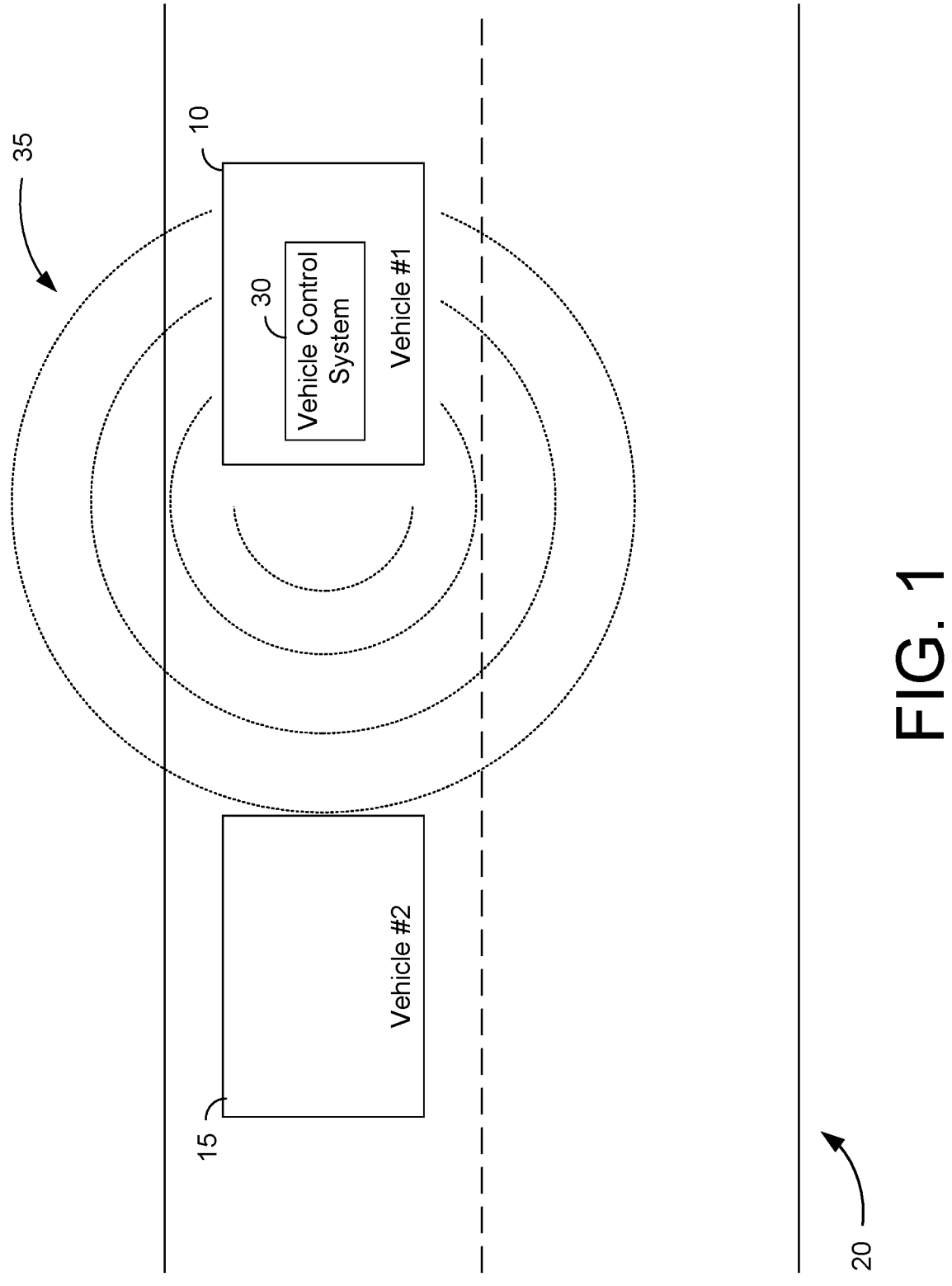
FIG. 1 is a schematic diagram showing a vehicle with a vehicle control system in use on a road.

FIG. 1 shows an embodiment of a vehicle with a vehicular control system in use on a road. As shown in FIG. 1, a first vehicle 10 and a second vehicle 15 are travelling on a road 20. The first vehicle 10 includes a vehicle control system 30 that includes several devices and/or systems that can be used to detect objects in the vicinity of the first vehicle 10 (such as the second vehicle 15) and/or to control operation of the first vehicle 10. For example, the vehicle control system 30 can incorporate a radar system 50 (see FIG. 2) that emits electromagnetic waves (e.g., radio waves) 35 that can be used to detect objects (e.g., the second vehicle 15) that are near the first vehicle 10. The first vehicle 10 can then use the information provided by the vehicle control system 30 to control the operation of the (first) vehicle 10.

Figure 2:
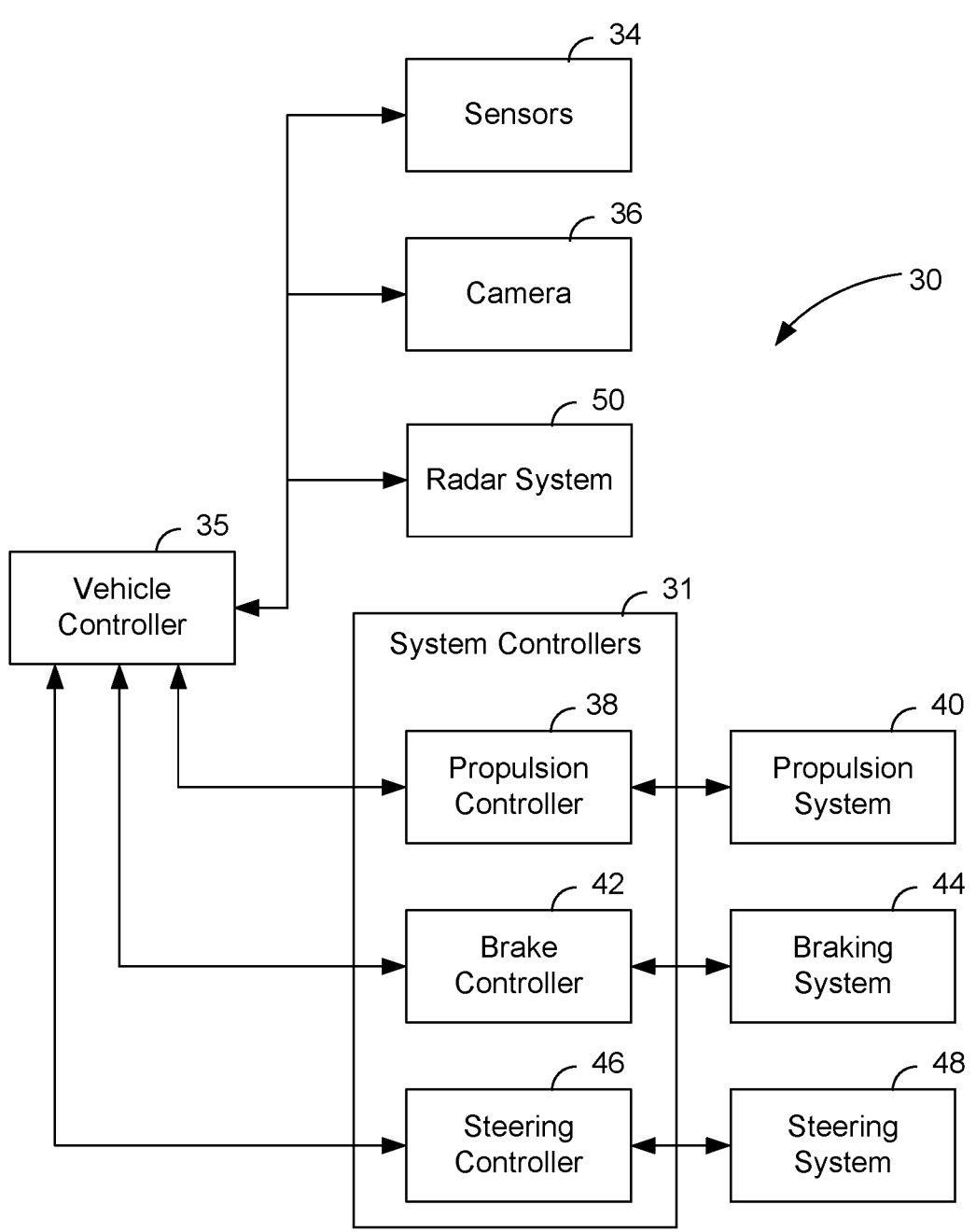
FIG. 2 is a block diagram showing an embodiment of the vehicle control system from FIG. 1.

FIG. 2 shows an embodiment of the vehicle control system 30. The vehicle control system 30 can include a vehicle controller 35. The vehicle controller 35 may receive information regarding the vehicle's environment, operation, location, and/or other parameters from vehicle system controllers 31, sensors 34, cameras 36, and radar system 50. The vehicle system controllers 31 can include one or more propulsion controllers 38 for managing the operation of and communicating with the propulsion system 40 for the vehicle 10 (e.g., an internal combustion engine or electric motor(s)), one or more brake controllers 42 for managing the operation of and communicating with the braking system 44, and one or more steering controllers 46 for managing the operation of and communicating with the steering system 48. Vehicle controller 35 can also communicate with one or more cameras 36, one or more sensors 34, and the radar system 50 to collect information to make an assessment of the vehicle's position and the surrounding environment. The cameras 36 can be used to collect information related to the vehicle's environment and location, and may rely on visual identification and interpretation of the vehicle's exterior environment. Cameras 36 may operate with or without other sensors 34 or the radar system 50 to provide environmental and vehicular information. For example, a camera 36 may visually detect the boundaries of a lane on the road 20 in which the vehicle 10 is traveling, while the radar system 50 detects the presence of an object (e.g., the second vehicle 15) within the trajectory of the vehicle 10 in the lane. The information provided by both the cameras 36 and the radar system 50 may be provided to the vehicle controller 35 to be interpreted and used to control the operation (e.g., to control the velocity) of the vehicle 10. In addition, sensors 34 can be used to collect information regarding the vehicle's position and the surrounding environment. In an embodiment, the sensors 34 can include, but are not limited to, accelerometers, tachometers, speedometers, global positioning systems (GPS), light detecting and ranging (LIDAR) systems, temperature sensors, emission sensors, pressure sensors, and fluid level sensors.

The vehicle controller 35 can communicate with vehicle system controllers 31 to receive information about vehicle operations and to direct the corresponding systems which are controlled by vehicle system controllers 31. For example, the vehicle controller 35 may direct the propulsion controller 38 to alter operations of propulsion system 40 (e.g., thrust generated by the propulsion system 40), the brake controller 42 to initiate, stop, or change the operation of braking system 44, or the steering controller 46 to alter the direction of travel of the vehicle using the steering system 48. In some embodiments, the vehicle controller 35 can direct more than one system to alter vehicle operations simultaneously or otherwise.

Figure 3:
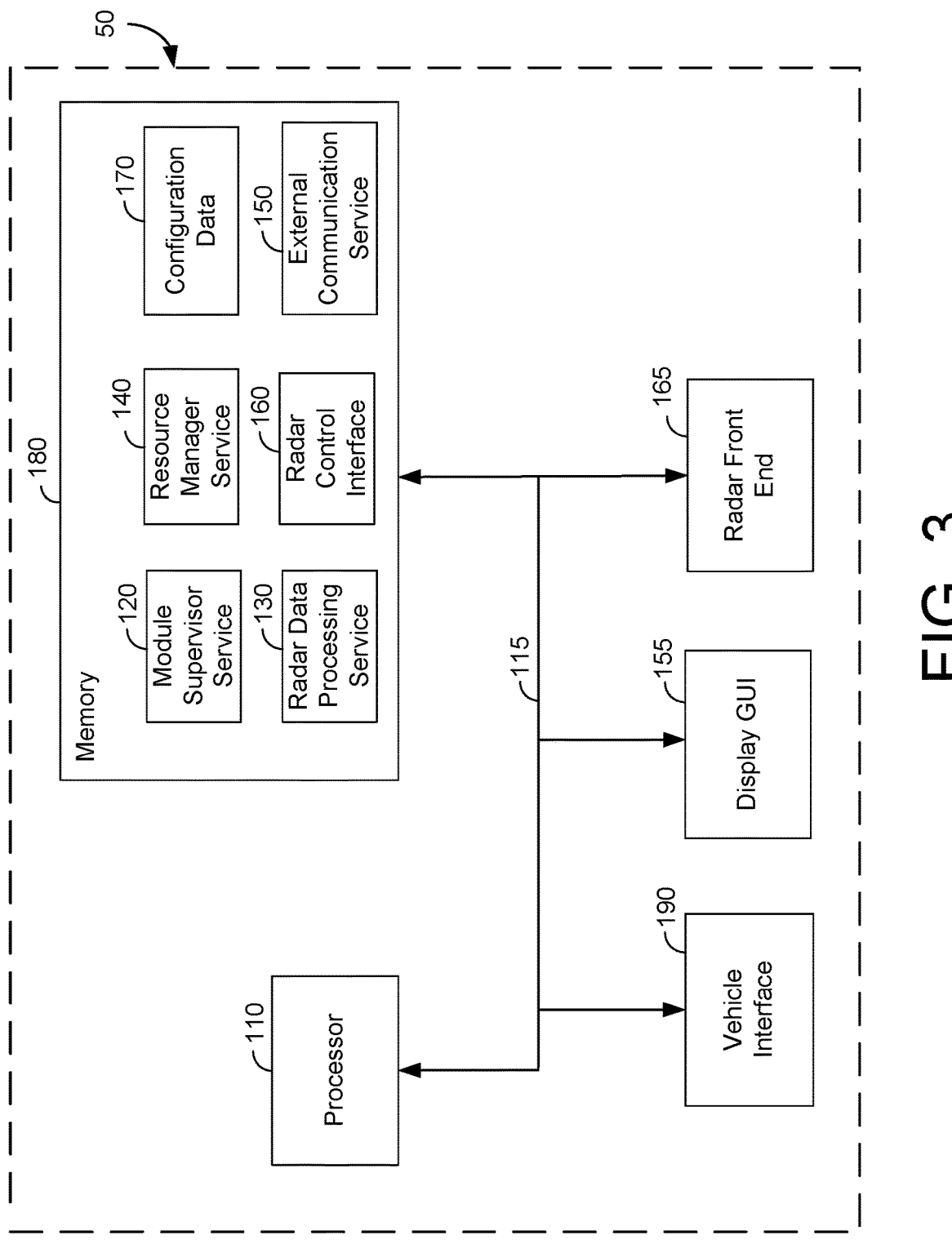
FIGS. 3 and 4 are block diagrams showing an embodiment of the radar system from the vehicle control system of FIG. 2.
Figures 4, 5:
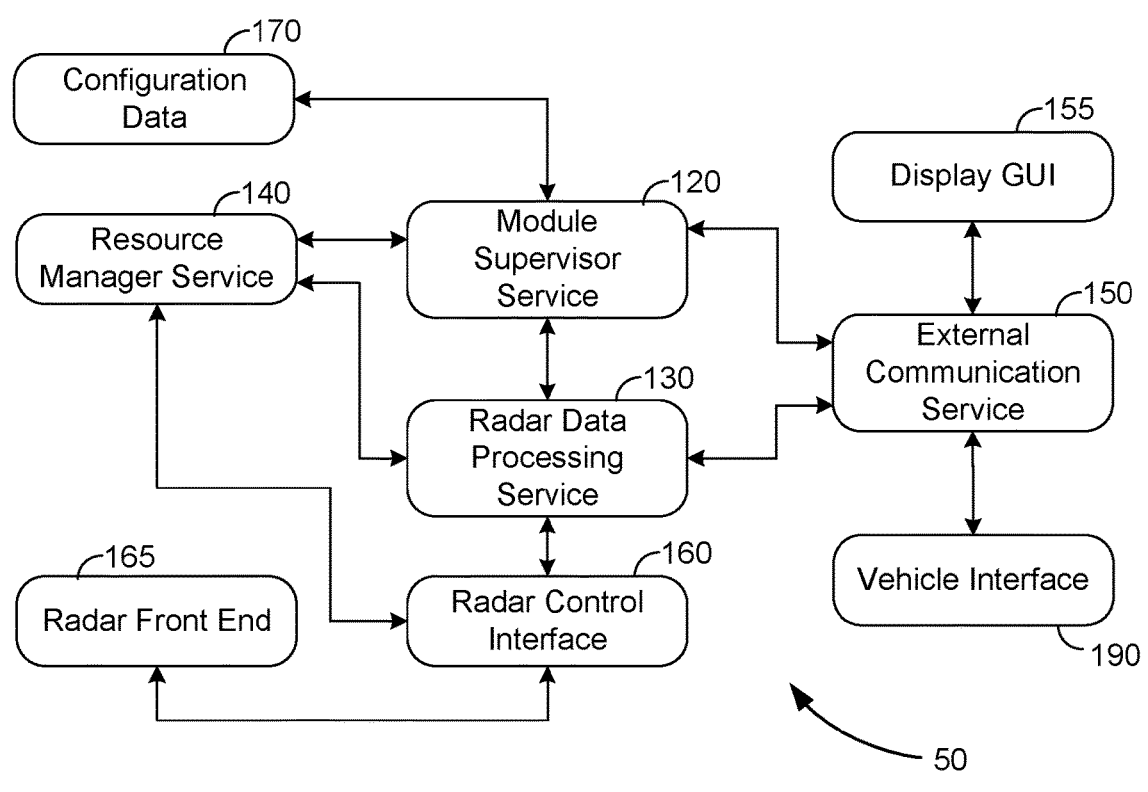
FIG. 5 is a block diagram showing an embodiment of the module supervisor service from the radar system of FIG. 3.

FIGS. 3 and 4 show an embodiment of the radar system 50 from the vehicle control system 30. The radar system 50 shown by FIG. 3 can include logic 120, referred to herein as "the module supervisor service" or "the mode controller," for generally controlling the operation of the radar system 50. The radar system 50 also includes logic 130, referred to herein as "the radar data processing service" or "the data services system," logic 140, referred to herein as "the resource manager service," logic 150, referred to herein as "the external communication service" or "the messaging system," and logic 160, referred to herein as "the radar control interface" or "the radar common interface." The radar data processing service 130 can be used to infer information about the environment (or 3D vector space) based on information received from a radar front end 165 (via the radar control interface 160 as shown in FIG. 4). The resource manager service 140 can be used to optimize the usage of the radar front end 165 (via the radar control interface 160) based on information from the module supervisor service 120. The external communication service 150 can be used to manage external communications to and from the radar system 50. The radar control interface 160 can be used to control the operation of the radar front end 165 and/or manage the data received from the radar front end 165. In other embodiments, the radar data processing service 130, the resource manager service 140, the external communication service 150 and/or the radar control interface 160 can be combined with the module supervisor service 120 or with one another. The module supervisor service 120, the radar data processing service 130, the resource manager service 140, the external communication service 150 and the radar control interface 160 may be implemented in software, firmware, hardware, or any combination thereof. In FIG. 3, the module supervisor service 120, the radar data processing service 130, the resource manager service 140, the external communication service 150 and the radar control interface 160 are implemented in software and stored in memory 180. However, other configurations of the module supervisor service 120, the radar data processing service 130, the resource manager service 140, the external communication service 150 and the radar control interface 160 are possible in other embodiments.

Note that the module supervisor service 120, the radar data processing service 130, the resource manager service 140, the external communication service 150 and the radar control interface 160, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The radar system 50 may include at least one conventional processor 110, which includes processing hardware for executing instructions stored in the memory 180. As an example, the processor 110 may include a central processing unit (CPU) or a digital signal processor (DSP). The processor 110 communicates to and drives the other elements within the radar system 50 via a local interface 115, which can include at least one bus. When the module supervisor service 120, the radar data processing service 130, the resource manager service 140, the external communication service 150 and the radar control interface 160 are implemented in software, the processor 110 may execute instructions of the module supervisor service 120, the radar data processing service 130, the resource manager service 140, the external communication service 150 and the radar control interface 160 to perform the functions ascribed herein to the corresponding components.

The radar system 50 can include configuration data 170 that has information regarding the operation and capabilities of the radar system 50. In addition, the radar system 50 can include a vehicle interface 190 (e.g., data ports) for connecting the radar system 50 to the vehicle controller 35 (see FIG. 2) and a display GUI (graphical user interface) 155 that permits the radar system 50 to provide information to a user directly via a display in the vehicle 10. In an embodiment, the module supervisor service 120 of the radar system 50 can be used to manage process execution in the radar system 50 and control operation of the radar system 50 and the corresponding components of the radar system 50. The module supervisor service 120 can communicate with (i.e., send and receive information, data, messages, commands, etc.) with the radar data processing service 130, the resource manager service 140, the external communication service 150 and the configuration data 170. The radar control interface 160 can facilitate control of the operation of the radar front end 165 by the module supervisor service 120. The external communication service 150 can facilitate communication between the module supervisor service 120 and the display GUI 155 or the vehicle interface 190.

FIG. 5 is a block diagram showing an embodiment of the module supervisor service 120. The module supervisor service 120 can manage process execution in the radar system 50 and can control the radar front end 165. The module supervisor service 120 can include a process controller 122 that can be used to control the operation of the components of the radar system 50, ensure that each component of the radar system 50 has the appropriate information at the appropriate time and facilitate communication between the components of the radar system 50. The module supervisor service 120 can also include a vehicle context monitor 124. The vehicle context monitor 124 can be used to control the communication of vehicle information and commands between the radar system 50 and the vehicle controller 35 and/or the operator of the vehicle 10 via the external communication service 150. In addition, the vehicle context monitor 124 can receive information about the status of the vehicle 10 and provide contextual information to the service managers 125 as described in more detail below. In an embodiment, the contextual information from the vehicle context monitor 124 can correspond to a series of discrete states for the vehicle that may be user-programmable. The vehicle context monitor 124 may switch between states (of the vehicle) in response to changes in vehicle conditions (e.g., velocity) or to other changes relating to the operation of the vehicle.

The module supervisor service 120 can include several service managers 125 that generate tasks for the radar front end 165 based on: 1) information about the surrounding environment (e.g., scene parameters) provided to the service managers 125 by the radar data processing service 130; and 2) contextual information about the vehicle provided to the service managers 125 by the vehicle context monitor 124.

The tasks generated by the service managers 125 in response to the received information are provided to the resource manager service 140. The resource manager service 140 can then review each of the tasks received from the service managers 125 and determine whether the task should be executed and/or implemented and in what order the tasks are to be executed and/or implemented by the radar front end 165. The ordered tasks from the resource manager service 140 are provided to the radar control interface 160 for subsequent execution and/or implementation by the radar front end 165.

Figure 6:
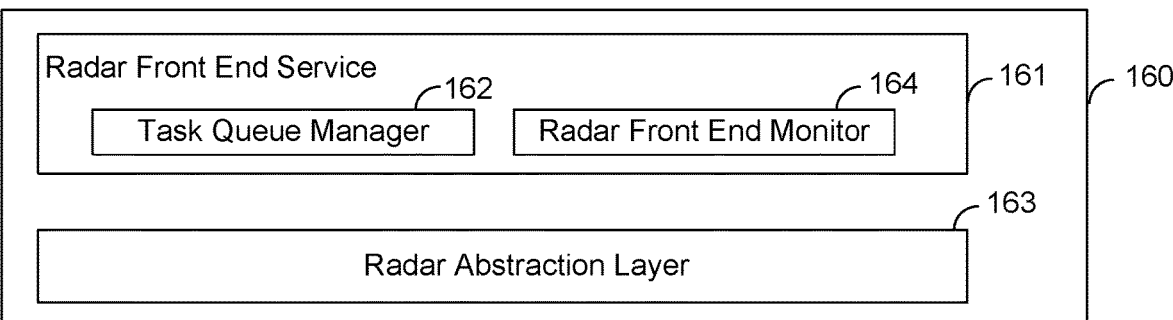
FIG. 6 is a block diagram showing an embodiment of the radar control interface from the radar system of FIG. 3.

FIG. 6 is a block diagram showing an embodiment of the radar control interface 160. The radar control interface 160 can include a radar front end service 161 and a radar abstraction layer 163. In an embodiment, the radar front end service 161 can manage the control and status of the radar front end 165. In addition, the radar front end service 161 can be an abstraction layer for the tasks from the resource manager service 140 to permit the tasks from the resource manager service 140 to be understood by the radar front end 165 such that the radar front end 165 can execute and/or implement the corresponding tasks. The radar front end service 161 can include a task queue manager 162 and a radar front end monitor 164.

The task queue manager 162 receives the tasks from the resource manager service 140 and provides the tasks (e.g., in the order received from the resource manager service 140 or according to a highest priority or ranking) to the radar front end 165 such that the radar front end 165 emits the particular radar scan pattern and corresponding waveforms indicated in the task. In an embodiment, each task can include the emission properties for the waveforms associated with a task and the radar front end service 161 can process the emission properties into corresponding instructions and/or appropriate parameters for the radar front end 165 to implement the task. The radar front end monitor 164 can receive information regarding the health and status of the radar front end 165 from the radar front end 165 to ensure that the radar front end 165 is operating as expected. The front end monitor 164 can also determine when a task has been completed by the radar front end 165 and request another task be added to the task queue manager 162 by the resource manager service 140. In an embodiment, the radar front end monitor 164 can provide the health and status information from the radar front end 165 to the array manager 145 (see FIG. 10) of the resource manager service 140 for subsequent use by the array manager 145 as described in more detail below. The radar abstraction layer 163 can receive "raw" radar data from the radar front end 165 and convert the received data into useful data or information (e.g., an RD(E) map with range, direction and elevation information, spatial spectra information, CFAR (constant false alarm rate) cell information, radar status, etc.) to be provided to the radar data processing service 130 for subsequent processing and/or analysis by the radar data processing service 130 and/or the resource manager service 140.

In an embodiment, the radar control interface 160 can be specifically configured to permit the resource manager service 140 and the radar data processing service 130 (or other components of the radar system 50) to communicate with a particular hardware configuration of the radar front end 165. By using the radar control interface 160 to facilitate communication between both the resource manager service 140 and the radar data processing service 130 and the radar front end 165, a change in the hardware of the radar front end 165 does not require a change to the resource manager service 140 and the radar data processing service 130. Only a change to the radar control interface 160 has to occur to enable communication between both the resource manager service 140 and the radar data processing service 130 and the new radar front end 165. In other words, the resource manager service 140 and the radar data processing service 130 can function with different radar front ends 165 simply by providing the appropriate radar front end service 161 and radar abstraction layer 163 in the radar control interface 160.

Figure 7:
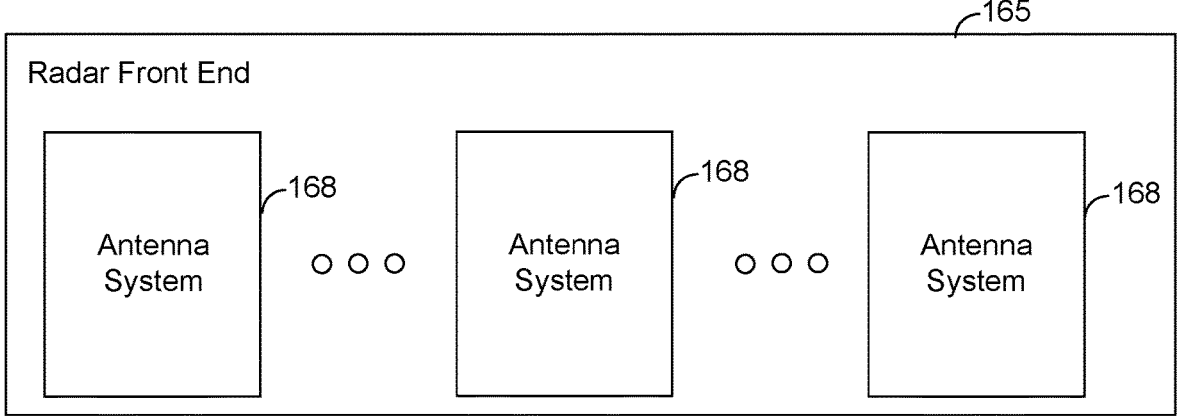
FIG. 7 is a block diagram showing an embodiment of the radar front end from the radar system of FIG. 3.

FIG. 7 is a block diagram showing an embodiment of the radar front end 165. The radar front end 165 can include an array of antenna systems 168 (three are specifically shown in FIG. 7). In an embodiment, the array of antenna systems 168 can include twelve (12) antenna systems 168 positioned at different locations of the vehicle 10, however, other embodiments may include more than twelve antenna systems 168 or fewer than twelve antenna systems 168. The antenna systems 168 of the array of antenna systems 168 can be individually setup and controlled to emit electromagnetic waves (e.g., radio waves) having different waveforms and to receive reflected electromagnetic waves upon the emitted electromagnetic waves being reflected off of an object. The waveform emitted by each antenna system 168 can be based on the emission parameters associated with a particular task provided to the radar front end service 161. The antenna systems 168 can be arranged to emit a particular waveform having particular waveform parameters (which waveform and parameters can change over time) based on the instructions and parameters received from the radar front end service 161. In addition, the instructions and parameters received from the radar front end service 161 can control whether or not a specific antenna system 168 emits a waveform (e.g., a first antenna system 168 may emit a waveform while a second antenna system 168 is inactive and does not emit a waveform). For example, all antenna systems 168 may emit a waveform when a wide view of the environment is desired and only a few antenna systems 168 located at the center of the vehicle 10 may emit a waveform when a narrow view of the environment is desired (e.g., when another vehicle is in front of the vehicle 10).

Figure 8:
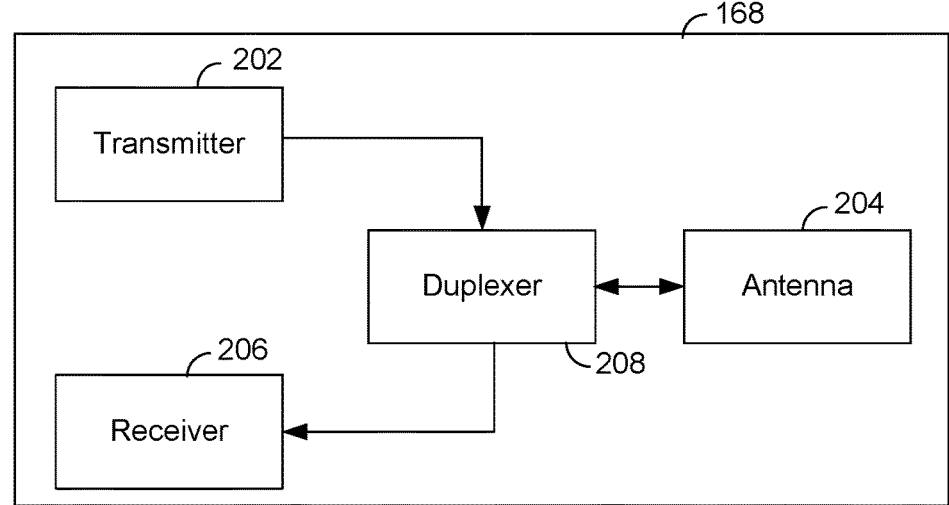
FIG. 8 is a block diagram showing an embodiment of the antenna system from the radar front end of FIG. 7.

As shown in FIG. 8, each antenna system 168 can include a transmitter 202 to emit the electromagnetic waves via an antenna 204 and a receiver 206 to receive reflected electromagnetic waves from an object in the environment via the antenna 204. The antenna system 168 can also include a duplexer 208 to separate transmit and receive signals. Further, it is to be understood that the antenna system 168 may include additional components (not specifically shown) to process signals associated with the transmission and reception of the electromagnetic waves. In an embodiment, the transmitter 202 and the receiver 206 may be incorporated into a transceiver. The antenna systems 168 may be collectively positioned at a common location of the vehicle 10 in one embodiment. However, in other embodiments, each antenna system 168 may be individually positioned at varying locations of the vehicle 10 including the front of the vehicle, the back of the vehicle and both sides of the vehicle.

In an embodiment, each antenna system 168 can be arranged to emit waveforms associated with one or more of short-range radar (SRR), medium-range radar (MRR) and long-range radar (LRR). In an embodiment, SRR can be used to detect objects in the environment up to about 30 yards from the vehicle 10, MRR can be used to detect objects in the environment from about 30 yards from the vehicle to about 100 yards from the vehicle 10, and LRR can be used to detect objects in the environment more than 100 yards from the vehicle 10. For example, the emission parameters associated with one task may result in the antenna systems 168 performing a scan pattern that includes one or more SRR scans followed by one or more LRR scans. In addition, the antenna systems 168 can emit waveforms having a frequency range of about 77 GHz. However, in other embodiments, the antenna systems 168 can emit waveforms having a frequency in the range of 76 GHz-81 GHz.

In an embodiment, the antenna systems 168 are generally arranged for ground-to-ground radar applications (i.e., the vehicle 10 is located on the ground and the radar system 50 is being used to detect objects that are also located on the ground). Each antenna system 168 can have a substantially fixed position on the vehicle 10 and emits waveforms in a predefined "beam-pointing direction" (e.g., a fixed azimuth angle and a substantially fixed elevation angle). In other words, the position and beam-pointing direction of each antenna system 168 cannot be changed by the tasks from the radar control interface 160. The radar control interface 160 can only provide instructions to the radar front end 165 that control the waveforms emitted by the antenna systems 168. As the antenna systems 168 receive the reflected electromagnetic waves from objects in the environment, the antenna systems 168 provide the corresponding "raw" data from the reflected electromagnetic waves to the radar abstraction layer 163. The radar abstraction layer 163 can then take the data from the antenna systems 168 and convert the data into appropriate data (e.g., an RD(E) map with range, direction and elevation information, spatial spectra information, and/or CFAR (constant false alarm rate) cell information) for the radar data processing service 130 to process the data into one or more higher-level data products (e.g., a "scene" parameter).

Figure 9:
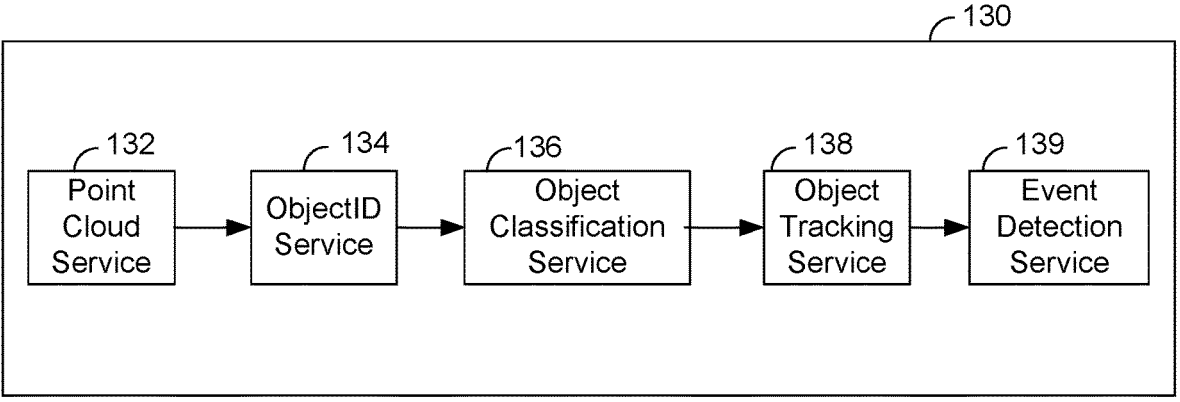
FIG. 9 is a block diagram showing an embodiment of the radar data processing service from the radar system of FIG. 3.

FIG. 9 is a block diagram showing an embodiment of the radar data processing service 130. The radar data processing service 130 can take raw data from the radar front end 165 (after conversion by the data abstraction layer 163) and detect and track one or more objects (if present) in the environment (or 3D vector space) from the raw data. For example, the radar data processing service 130 can make determinations regarding the type of object detected (e.g., a car or person), is the object moving or are multiple objects present, etc. The radar data processing service 130 can detect and track the objects using scene parameters corresponding to a world view of the environment (e.g., an object in front of the vehicle at a particular location with a particular certainty). The scene parameter for an object can include descriptive statistics such as a type and/or a kinematic state (e.g., position and velocity) for the object.

As shown in FIG. 9, the radar data processing service 130 can include a point cloud service 132, an object identification (object) D) service 134, an object classification service 136, an object tracking service 138 and an event detection service 139. The point cloud service 132 can receive the raw data (e.g., an RD(E) or an R-D-El map with range, direction and elevation information, spatial spectra information, and/or CFAR cell information) from the radar front end 165 (via the radar abstraction layer 163 of the radar control interface 160) and convert the raw data into one or more point clouds that define points in a space. In addition, the point cloud service 132 can provide, for each point in a point cloud, information relating to its velocity (or Doppler), range, azimuth and, in some embodiments, elevation. In an embodiment, the point cloud service 132 can apply different resolution algorithms (based on an input from the resolution manager 147) to the raw data to generate point clouds of differing resolution (i.e., the number of points in the point cloud) such that different aspects of the environment can be examined or analyzed. In another embodiment, the point cloud service 132 can use either cell averaging CFAR or can calculate a threshold for power (power thresholding) to construct a point cloud. The point cloud information (e.g., the point clouds and a distance between points) can then be provided to the objectID (object identification) service 134, which can then look at the points and perform clustering to determine or detect if an object is present in the environment. In an embodiment, the objectID service 134 can use a DBSCAN clustering algorithm to detect objects and can calculate centroids to represent detections. However, other suitable clustering algorithms may be used in other embodiments.

The object classification service 136 can use an object list with object information from the objectID service 134 to classify the type of object (e.g., from a list of possible types of objects) that was detected and provide (or revise, if previously classified) a confidence level for the classification. In an embodiment, the object classification service 136 can classify objects by passing point cloud clusters through a graph neural network to determine the specific type of object. In another embodiment, the object classification service 136 can perform a static classification of an object based on a single frame of data using a "naïve" Bayesian network. Some examples of object classifications can include pedestrian, bicyclist, motorcycle, car truck, stationary object, road obstacle, wall, bridge, hydrant, or stoplight.

The object tracking service 138 can use the object information in the classified object list from the object classification service 136 to track the object over time to determine if the same object is present and generate track information (or a track) for the object. The track information can include kinematic properties of the object and elevation, azimuth and range information about the object. The object tracking service 138 may also perform a secondary classification of the object using a "dynamic" Bayesian network that applies a recursive Bayesian inference to update the belief about what the object is over time. In an embodiment, the object tracking service 138 can associate detected objects with currently known tracks using a Jonker-Volgenant algorithm. However, other suitable tracking algorithms may be used in other embodiments. In addition, the object tracking service 138 can provide position prediction and filtering using either an alpha-beta filter or an extended Kalman filter. However, other suitable types and/or configurations of filters may be used in other embodiments. In an alternate embodiment, the object tracking service 138 can receive the object list with object information from the objectID service 134 to group the objects from the object list into one or more tracks. The track information on an object from the object tracking service 138 can then be provided to the object classification service 136 for classification of the object.

The event detection service 139 can receive track information (or tracks) for different objects from the object tracking service 138 and determine if there are any relationships between individual objects (and their corresponding tracks) that may correspond to a possible "event." For example, the event detection service 139 may determine that there is a relationship between a pedestrian track and one or more stationary object tracks, which information can then be used by the event service manager 128 to determine that a person may be standing between parked cars. The radar data processing service 130 can provide point cloud information from the point cloud service 132, updated track information and/or scene parameters from the object tracking service 138 and relationship (or event) information from the event detection service 139 to the service managers 125 of the module supervisor service 120 to enable the service managers 125 to interpret or comprehend what is occurring in the environment (or a particular scene) to be able to make decisions on how to control the radar front end 165 to interact with the environment.

The service managers 125 can use control AI (artificial intelligence) to make determinations on the importance of objects in the environment and to control the operation of the radar front end 165 to optimize radar usage. For example, the service managers 125 can be used to determine the desired actions of the radar front end 165 (when interacting with the environment) to increase the radar system's knowledge of what is going on in the environment. The service managers 125 can include a search service manager 126, a track service manager 127 and an event service manager 128. Each of the search service manager 126, the track service manager 127 and the event service manager 128 generate tasks for the radar front end 165 that are used to optimize the particular services provided by the search service manager 126, the track service manager 127 and the event service manager 128. In an embodiment, the search service manager 126, the track service manager 127 and the event service manager 128 can use contextual information on the vehicle from the vehicle context monitor 124 when selecting and prioritizing tasks (and corresponding waveforms) for the radar front end 165. The search service manager 126 can be used to determine where to scan to passively track objects in the environment and to locate new objects in the environment surrounding the vehicle 10. The search service manager 126 can use the scene parameters and other information (e.g., vehicle velocity or vehicle steering angle) to generate tasks for the radar front end 165 that correspond to a radar scan pattern that can operate to passively track objects and locate new objects in the environment. For example, the search service manager 126 may select from a first group of tasks (or waveforms) based on a first vehicle context (e.g., a parking lot) from the vehicle context monitor 124 and a second group of tasks (or waveforms) based on a second vehicle context (e.g., a freeway) from the vehicle context monitor 124. The track service manager 127 can be used to review the scene parameter(s) from the radar data processing service 130 and determine if the collection of additional information (e.g., higher resolution information or data) about an object is desirable or if there is a collision possibility between an object and the vehicle 10. In an embodiment, the track information updates from the object tracking service 138 can include information regarding the scene parameters. Similar to the search service manager 126, the track service manager 127 can generate tasks for the radar front end 165 (e.g., a particular radar scan pattern) that can operate to obtain additional information about an object (e.g., from an increase in resolution or an increase in the confidence of the detected information) or obtain additional information to determine the probability of a collision with an object.

The track service manager 127 can use the scene parameters and/or the track information updates from the radar data processing service 130 with a prioritization scheme to determine if additional information about a particular object is to be collected. For example, when the vehicle 10 is moving at a higher rate of speed or is located on a freeway, the track service manager 127 can prioritize objects that are further downfield from the front of the vehicle 10, while when the vehicle 10 is moving at a lower rate of speed or is located on surface streets, the track service manager 127 can prioritize objects that are both more directly in front of the vehicle 10 and to the sides of the vehicle 10. In another example, an object getting closer to the vehicle 10 (such as the object slowing down or stopping in front of the vehicle 10) can be prioritized for additional information over an object moving away from the vehicle 10. In addition, if the collection of additional information is determined to be desirable, the track service manager 127 can use the observations from the environment (e.g., the scene parameters) along with information on past actions (e.g., past knowledge), goals and preferences for the radar system 50 and the abilities of the radar front end 165 (from the configuration data 170) to determine the appropriate waveforms for the radar front end 165 to gather more information about an object that can result in an increase in the confidence of the data associated with the object.

In an embodiment, the track service manager 127 can include an artificial neural fuzzy inferencing system (ANFIS) to analyze the track information updates from the radar data processing service 130 and create the task requests (and corresponding radar scan patterns) for the radar front end 165. The ANFIS can be a hybrid of neural network concepts and fuzzy logic concepts where the nodes of the network are user-selected based on the features expected to be seen from the track information updates. The track service manager 127, more specifically the ANFIS, can evaluate the object type and kinematic properties from the track information update to determine an "importance" level for the object and corresponding track in the environment. In an embodiment, the importance value can be a numeric value that indicates an object's relevance to the trajectory of the vehicle 10. For example, an object such as the second vehicle 15 in front of vehicle 10 can have a higher importance value (indicating more importance to the trajectory of the vehicle 10) than an object such as a tree to the side of the vehicle 10, which would have a lower importance value (indicating less importance to the trajectory of the vehicle 10). Once the importance level for the object reaches a predefined threshold value (indicating that the object may impact the trajectory of the vehicle 10), additional information can be collected about the object.

The ANFIS of the track service manager 127 can generate radar scan patterns having particular waveforms to be emitted by the antenna systems 168 of the radar front end 165 to collect the additional information. The radar scan patterns can include different waveforms where waveform parameters, such as pulse width, chirp parameters (including frequency and slope), number of pulses, etc., can be changed to more effectively collect information about a particular aspect of the object. For example, if the importance threshold value was exceeded by an object moving into the trajectory of the vehicle 10 (e.g., the second vehicle 15 moves into the same lane as the vehicle 10), a first set of waveforms and corresponding waveform parameters can be implemented to collect information relating to the closing speed for the object. In contrast, if the importance threshold value was exceeded by an object already in the trajectory of the vehicle 10 (e.g., a slower moving second vehicle 15 in the same lane as the vehicle 10), a second set of waveforms and corresponding parameters may be implemented to more accurately determine the range of the object.

In an embodiment, the ANFIS of the track service manager 127 can make decisions on priority and waveforms to use to collect information (e.g., range or closing speed) about detected objects. The ANFIS of the track service manager 127 can be trained to make particular priority and waveform decisions based on particular observations from the environment. In an embodiment, the waveform decisions can be based on the needs of the track service manager 127 and entropy considerations. The training of the track service manager 127 can include classic convex optimization with closed form equations that optimize the waveform for a particular task. The deep neural network of the ANFIS of the track service manager 127 can also be trained to provide desired outputs by collecting data as the vehicle 10 is operated on the road 20. In addition, the deep neural network can also be trained to provide desired outputs by providing the deep neural network with simulation data that can specifically address situations that may be encountered by the vehicle (e.g., a second vehicle moving directly in front of the vehicle 10) and the corresponding tasks (e.g., radar scan patterns with specific waveforms) to be provided to the radar front end 165.

The event service manager 128 can receive information on multiple tracks associated with multiple objects from the event detection service 139 and contextual information on the vehicle from the vehicle context monitor 124. The event service manager 128 can then apply heuristics to review the multiple tracks and corresponding objects to determine if an event may occur. If the event service manager 128 determines that an event may occur, the event service manager 128 can create task requests (and corresponding radar scan patterns) for the radar front end 165 to gather more information about the tracks (and objects) to better analyze the possible event. In an embodiment, the service managers 125 can also include a collision mitigation (or avoidance) manager (not shown). The collision mitigation manager can receive point cloud information from the point cloud service 132 and track information from the object tracking service 138. The collision mitigation manager can make determinations regarding the possibility of a collision between the vehicle 10 and a corresponding singular object in the environment. The collision mitigation manager can create high priority task requests (and corresponding radar scan patterns) for the radar front end 165 to attempt to gather more information about the object and its track if the possibility of collision reaches a predefined threshold.

Figure 10:
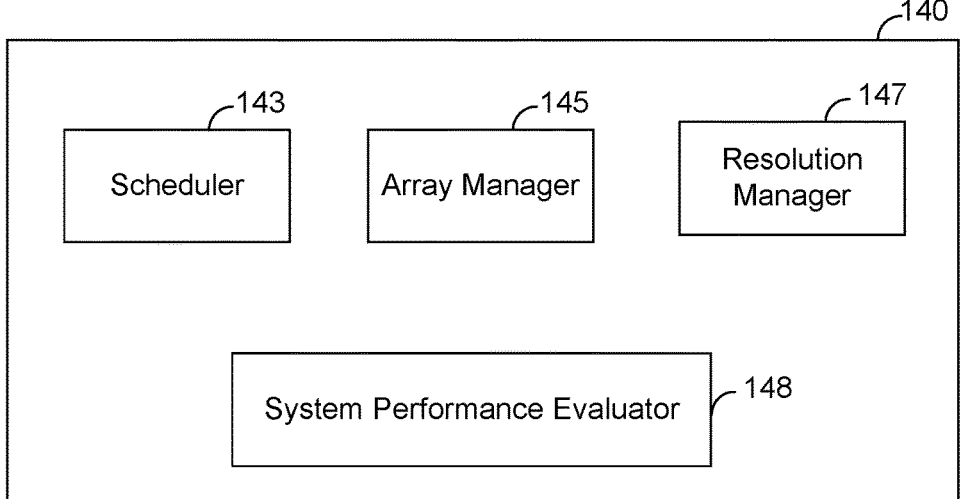
FIG. 10 is a block diagram showing an embodiment of the resource manager service from the radar system of FIG. 3.

FIG. 10 is a block diagram showing an embodiment of the resource manager service 140. The resource manager service 140 can include a scheduler 143, an array manager 145, a resolution manager 147 and a system performance evaluator 148. The tasks generated by the search service manager 126, the track service manager 127 and the event service manager 128 can be provided to the scheduler 143. The scheduler 143 can adjudicate between the provided tasks to determine the tasks (whether from the search service manager 126, the track service manager 127, the event service manager 128 or elsewhere) that optimize the performance of the radar system 50. The system performance evaluator 148 can provide information about system performance to the scheduler 143 to enable the scheduler 143 in identifying tasks that optimize performance of the radar system 50 and comply with system-level performance requirements. For example, the system performance evaluator 148 can inform the scheduler 143 that more tasks are being sent for tracking than for searching such that the system-level requirements directed to percentage of search time and percentage of track time are not being satisfied and more tasks for searching need to be sent to the radar control interface 160. The scheduler 143 can rank and/or prioritize the tasks provided by the search service manager 126, the track service manager 127, the event service manager 128, the array manager 145 or other input to the resource manager service 140 (e.g., from a perception stack of the vehicle controller 30) and provide, in one embodiment, the top two ranked tasks (or top two tasks having the highest priority) to the radar control interface 160 for subsequent implementation by the radar front end 165. In an embodiment, the rankings for tasks established by the scheduler 143 can be adjusted by the system performance evaluator 148 to ensure that system-level requirements are being satisfied.

The resource manager service 140 can also include an array manager 145 to manage the resources of the radar front end 165 and a resolution manager 147 to control operation of the point cloud service 132 and the digital signal processing performed therein. The array manager 145 can receive information about the health and status of the radar front end 165 from the radar front end monitor 164. The array manager 145 can then evaluate the information (e.g., temperature) relating to the radar front end 165 and determine if any tasks are desirable to improve operation of the radar front end 165 such that the radar front end 165 is not overtaxed (e.g., a "blank dwell" task to provide temperature control). The tasks, if any, generated by the array manager 145 can then be provided to the scheduler 143 for subsequent implementation by the radar front end service 161 of the radar control interface 160. In an embodiment, the array manager 145 may also provide information to the scheduler 143 regarding the operation capabilities of the radar front end 165 that the scheduler 143 can use when ranking tasks. The resolution manager 147 can receive information about the status of the vehicle 10 from the vehicle context monitor 124 of the module supervisor service 120 and track information (e.g., a track list) from the track service manager 127. The resolution manager 147 can then evaluate the information relating to the status of the vehicle 10 and the track information to determine the appropriate resolution algorithm (e.g., a high resolution algorithm or a low resolution algorithm) to be applied by the point cloud service 132 when processing the "raw" data from the radar front end 165. For example, a high resolution algorithm may be applied in order to get a higher resolution (e.g., more points) in a generated point cloud.

Figure 11:
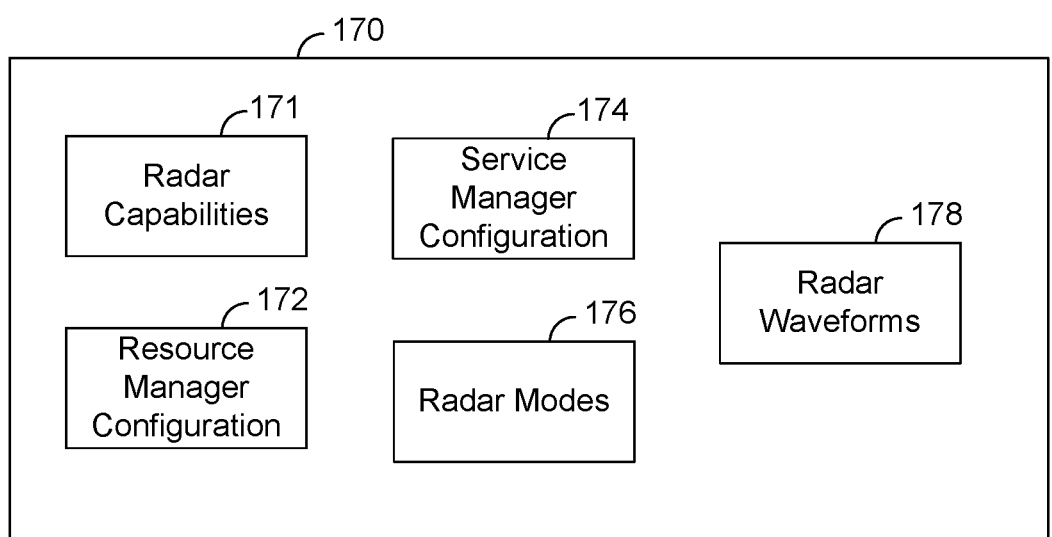
FIG. 11 is a block diagram showing an embodiment of the configuration data from the radar system of FIG. 3.

FIG. 11 is a block diagram showing an embodiment of the configuration data 170. The configuration data 170 can include information regarding different possible configurations and/or capabilities of the components of the radar system 50. The module supervisor service 120, radar data processing service 130, the resource manager service 140 and the external communication service 150 can use information stored in configuration data 170 when performing the functions or operations of the radar system 50. The configuration data 170 can include radar capabilities data 171, resource manager configuration data 172, service manager configuration data 174, radar mode data 176 and radar waveform data 178. In other embodiments, the configuration data 170 may include additional types of data pertaining to the operation and performance of the radar system 50.

The radar capabilities data 171 provides information on the radar front end 165 that can be used by the radar front end monitor 164 when evaluating the radar front end 165. In an embodiment, the radar capabilities data 171 can include information regarding the operation of the radar front end 165 such as bandwidths (e.g., 500 MHz), operating frequencies (e.g., 76 GHz-81 GHz), mode switch times, beamforming, time division multiple access, frequency division multiple access, etc. The resource manager configuration data 172 provides information about the configuration of the resource manager service 140. The service manager configuration data 174 can provide information on the configuration of each of the service managers 125 incorporated into the module supervisor service 120. The service manager configuration data 174 include information regarding the number of service managers 125 included with the module supervisor service 120 and a corresponding universal parameter set with information on each of the service managers 125. The radar mode data 176 can include a list of preset modes of operation for the radar front end 165 that can be used by the search service manager 126 and the track service manager 127 when generating tasks. The radar waveform data 178 can include a list of preset waveforms that can be output by the radar front end 165 that can be used by the search service manager 126 and the track service manager 127 when generating tasks.

Figure 12:
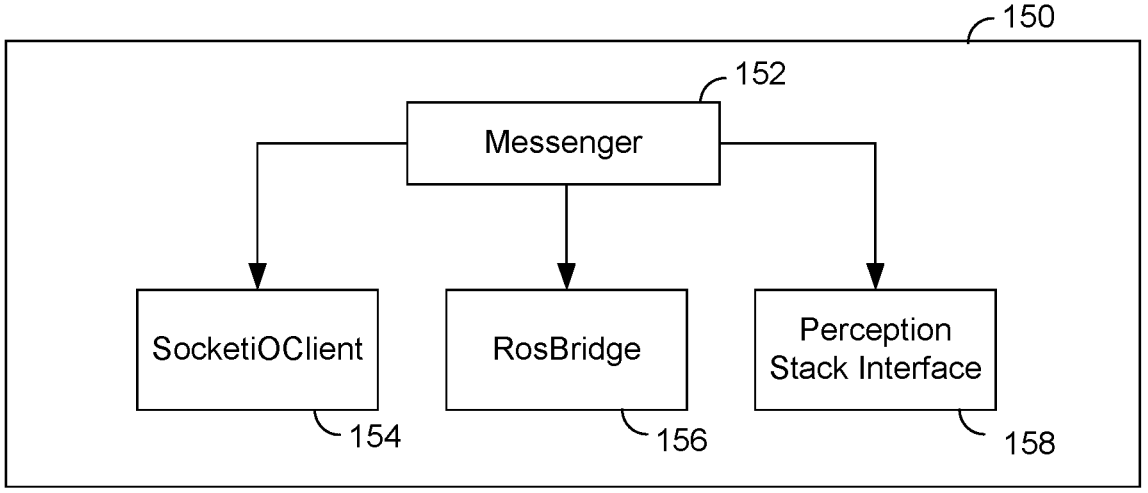
FIG. 12 is a block diagram showing an embodiment of the external communication service from the radar system of FIG. 3.

FIG. 12 is a block diagram showing an embodiment of the external communication service 150. The external communication service 150 can receive state information (e.g., resource manager state and radar system data state) from vehicle context monitor 124 of the module supervisor service 120 and provide vehicle state information and external command information to the vehicle context monitor 124 of the module supervisor service 120. The external communication service 150 includes a messenger 152 that facilitates communications between the vehicle context monitor 124 of the module supervisor service 120 and the external software engines (or systems) of the vehicle control system 30. As shown in FIG. 12, the external communication service 150 can include a socketiOClient interface 154, a RosBridge interface 156 and a perception stack interface 158 in communication with the messenger 152. The socketiOClient interface 154 can provide information for display to a socketiOServer of the display GUI 155. The RosBridge interface 156 can use the vehicle interface 190 to enable communication of information between a RosCore of a RVIZ (ROS visualization) system of the vehicle controller 35 and the external communication service 150. In an embodiment, the RVIZ can be a 3D visualization software tool for robots, sensors, and algorithms that permits a user to see the robot's perception of its world (real or simulated). The perception stack interface 158 can use the vehicle interface 190 to enable communication of information, such as vehicle state and directed commands, between a perception stack of the vehicle controller 35 and the external communication service 150.

Figure 13:
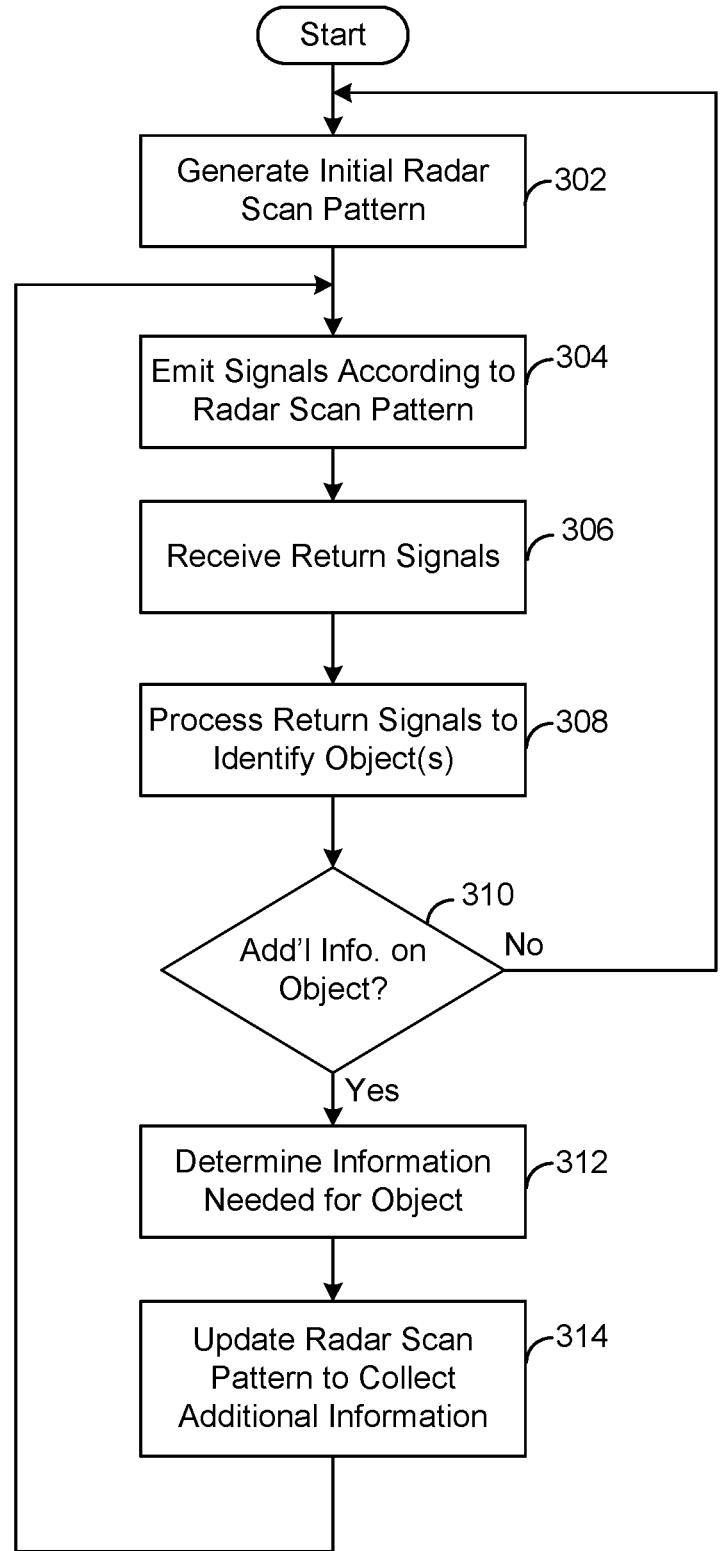
FIG. 13 is a flowchart showing an embodiment of a process for operating the radar system of FIG. 3.

FIG. 13 is directed to an embodiment of a process for determining a radar scan pattern to be emitted by a vehicle 10. The process begins by generating an initial radar scan pattern to be emitted by the radar front end 165 of the vehicle 10 (step 302). The initial radar scan pattern can include several different waveforms from the search service manager 126 that can be used to detect objects in the environment around the vehicle 10. The search service manager 126 provides the initial radar scan pattern to the scheduler 143 for subsequent providing to the radar control interface 160. The tasks associated with the initial radar scan pattern are provided to the task queue manager 162 of the radar front end service 161. The task queue manager 162 of the radar front end service 161 provides the associated tasks for the initial scan pattern to the radar front end 165.

The radar front end 165 can then emit the waveforms from the initial radar scan pattern (step 304) as set forth in the associated tasks for the initial radar scan pattern. The radar front end 165 then receives the return signals from the emitted waveforms (step 306). The radar front end 165 can then provide the raw data associated with the return signals to the radar abstraction layer 163 of the radar control interface 160. The radar control interface 160 then provides the raw data from the radar front end 165 to the radar data processing service 130. The radar data processing service 130 can process the raw data to generate scene parameters for one or more objects (step 308) based on the raw data. The radar data processing service 130 can identify the presence of an object, the type or class of the object and the track of the object in the scene parameters. The radar data processing service 130 can then provide the information regarding the object in the scene parameters to the service managers 125 of the module supervisor service 120.

The service managers 125 can then process the information about the object in the scene parameters received from the radar data processing service 130 and determine if additional information about the object is to be collected (step 310). The collection of additional information can be based on a determination made by the track service manager 127 regarding the importance of the object (i.e., the object has not reached the corresponding importance threshold) or a determination made by the track service manager 127 that all information obtainable about the object from the radar system 50 has been obtained (e.g., a signal-to-noise ratio indicates that additional information cannot be collected). If no additional information about the object is to be collected, the radar front end 165 can continue to emit the initial radar scan pattern, as requested by the search service manager 126, to search for objects in the environment around the vehicle 10.

However, if the service managers 125 determine that the collection of additional information about the object is desirable, the track service manager 127 can determine the additional desired information (e.g., additional parameters, additional points which represent the object (in the point cloud) or an increase in the resolution or confidence of known parameters) about the object (step 312) based on the scene parameters and the corresponding environment for the vehicle 10. The track service manager 127 can use the object information from the scene parameters to determine the additional information about the object that would be useful to the radar system 50 and the corresponding waveforms to be emitted by the radar front end 165 to collect the additional information. Based on the determination of the additional information about the object that is to be collected, the track service manager 127 can generate tasks associated with an updated scan pattern to collect the desired information (step 314).

The tasks associated with the updated scan pattern from the track service manager 127 are provided to the scheduler 143 for subsequent providing to the radar front end 165 as described above. The scheduler 143 can select the tasks associated with the updated radar scan pattern from the track service manager 127 over the tasks associated with the initial radar scan pattern from the service search manager 126 assuming that collecting information about a detected object is determined to have a higher priority than searching for additional objects. The track service manager 127 can generate several different additional radar scan patterns to collect different types of information (e.g., range or closing speed) about a known object. Each additional radar scan pattern can be different from the initial radar scan pattern and other additional radar scan patterns because different types of information about the object are to be detected and different patterns of waveforms can be used to collect the different types of information.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A system for a vehicle comprising:

a front end configured to detect one or more objects in an environment surrounding the vehicle with electromagnetic radiation, the front end comprising one or more antenna systems configured to emit and receive electromagnetic radiation;

a control system configured to control operation of the one or more antenna systems of the front end, the control system comprising:

a processor;

a memory device storing logic configured to determine a set of waveforms to be emitted by the one or more antennas and to evaluate return signals received by the one or more antennas in response to the emitted set of waveforms, wherein the logic is trained based on observation to determine relationships between (a) information about the environment surrounding the vehicle and associated parameters determinable from evaluation of the return signals, and (b) corresponding events; and the logic comprising instructions that, when executed by the processor, cause the processor to:

provide a first set of waveforms for emission by the one or more antenna systems of the front end;

analyze return signals received by the one or more antennas in response to the emission of the first set of waveforms;

generate one or more parameters associated with a first object in the environment surrounding the vehicle from the analysis of the return signals;

determine a possible event relating to the generated one or more parameters from the analysis of the return signals;

generate a second set of waveforms based on the generated one or more parameters associated with the first object in the environment surrounding the vehicle, wherein the second set of waveforms is different from the first set of waveforms;

provide the second set of waveforms for emission by the one or more antenna systems of the front end;

determine whether to collect additional information about the first object based on the one or more parameters associated with the first object, further in view of whether additional information relating to the determined possible event is prioritized over collecting additional information relating to one or more further objects, and further whether one or more characteristics of return signals received by the one or more antennas in response to the emission of the second set of waveforms indicate that such additional information cannot be obtained; and based on the determination whether to collect information about the first object,
    generate a third set of waveforms in response to a determination to collect additional information about the first object, wherein the third set of waveforms is different from the first set of waveforms and the second set of waveforms, or
  return to the first set of waveforms for emission by the one or more antenna systems of the front end.

2. The radar system of claim 1, wherein the logic further comprises instructions that, when executed by the processor, cause the processor to determine at least one of an object type or an object track when generating one or more parameters associated with the object.

3. The radar system of claim 1, wherein the logic further comprises instructions that, when executed by the processor, cause the processor to select between a first set of waveforms relating to obtaining a first type of information about the object and a second set of waveforms relating to obtaining a second type of information about the object when generating a third set of waveforms.

4. The radar system of claim 1, wherein the logic further comprises instructions that, when executed by the processor, cause the processor to:
  receive context information regarding the vehicle; and
  generate the second set of waveforms based on the received context information for the vehicle.

5. The radar system of claim 1, wherein the logic further comprises instructions that, when executed by the processor, cause the processor to:
  receive status information related to operation of the front end; and
  control operation of the front end based on the received status information.

6. The radar system of claim 1, further comprising a radar control interface connected between the front end and the control system, the radar control interface configured to permit sets of waveforms and return signals to be communicated between the front end and the control system.

7. A method for controlling a radar front end of a vehicle, the method comprising:
  training a module supervisor service based on observations over time to determine relationships between (a) information about an environment surrounding the vehicle and associated parameters determinable from evaluation of return signals received in response to emitted sets of waveforms, and (b) corresponding events;
  during operation and navigation of the vehicle:
    emitting, by the radar front end of the vehicle, signals corresponding to a first set of waveforms;
    receiving, at the radar front end, return signals in response to the emission of the first set of waveforms;
  analyzing, by a radar data processing system, the return signals to generate one or more parameters associated with a first object in an environment surrounding the vehicle;

determining, by the module supervisor service, a possible event relating to the generated one or more parameters from the analysis of the return signals;
  generating, by the module supervisor service, a second set of waveforms based on the one or more parameters associated with the environment, wherein the second set of waveforms is different from the first set of waveforms;
  emitting, by the radar front end of the vehicle, signals corresponding to the second set of waveforms;
  determining, by the module supervisor service, whether to collect additional information about the first object based on the one or more parameters associated with the first object, further in view of whether additional information relating to the determined possible event is prioritized over collecting additional information relating to one or more further objects, and further whether one or more characteristics of return signals received by the one or more antennas in response to the emission of the second set of waveforms indicate that such additional information cannot be obtained; and
  based on the determination whether to collect information about the first object,
    generating, by the module supervisor service, a third set of waveforms in response to a determination to collect additional information about the first object, wherein the third set of waveforms is different from the first set of waveforms and the second set of waveforms, or
    returning to the first set of waveforms for emission by the one or more antenna systems of the front end.

8. The method of claim 7, wherein the generating one or more parameters associated with an object in the environment includes determining at least one of an object type or an object track.

9. The method of claim 7, wherein the generating the third set of waveforms includes selecting between a first set of waveforms relating to obtaining a first type of information about the object and a second set of waveforms relating to obtaining a second type of information about the object.

10. The method of claim 7, further comprises:
  receiving, by the module supervisor service, context information regarding the vehicle; and
  the generating the second set of waveforms includes generating the second set of waveforms based on the received context information for the vehicle.

11. The method of claim 7, further comprises:
  receiving, by a resource manager system, status information related to operation of the front end; and
  controlling, by the resource manager system, operation of the front end based on the received status information.

12. The method of claim 7, further comprises communicating, by a radar control interface, sets of waveforms and return signals between the front end and the radar data processing system and the module supervisor service.

* * * * *